United States Patent
Bisbee et al.

(10) Patent No.: US 8,924,302 B2
(45) Date of Patent: Dec. 30, 2014

(54) SYSTEM AND METHOD FOR ELECTRONIC TRANSMISSION, STORAGE, RETRIEVAL AND REMOTE SIGNING OF AUTHENTICATED ELECTRONIC ORIGINAL DOCUMENTS

(75) Inventors: Stephen F. Bisbee, Baltimore, MD (US); Bryan K. Carpolette, Severna Park, MD (US); Jack J. Moskowitz, Glenwood, MD (US)

(73) Assignee: eOriginal, Inc., Baltimore, MD (US)

( * ) Notice: Subject to any disclaimer, the term of this patent is extended or adjusted under 35 U.S.C. 154(b) by 854 days.

(21) Appl. No.: 12/966,529

(22) Filed: Dec. 13, 2010

(65) Prior Publication Data

US 2012/0086971 A1    Apr. 12, 2012

Related U.S. Application Data

(60) Provisional application No. 61/284,042, filed on Dec. 11, 2009.

(51) Int. Cl.
*G06Q 30/00* (2012.01)
*H04L 9/32* (2006.01)
*H04L 9/08* (2006.01)

(52) U.S. Cl.
CPC .............. *G06Q 30/00* (2013.01); *H04L 9/321* (2013.01); *H04L 9/3297* (2013.01); *H04L 9/0897* (2013.01); *H04L 9/3247* (2013.01); *H04L 2209/12* (2013.01); *H04L 2209/30* (2013.01); *H04L 2209/38* (2013.01); *H04L 2209/608* (2013.01)
USPC ............................................. 705/50; 726/26

(58) Field of Classification Search
USPC ........................................................ 705/50
See application file for complete search history.

(56) References Cited

U.S. PATENT DOCUMENTS

| | | | |
|---|---|---|---|
| 4,885,777 A * | 12/1989 | Takaragi et al. | 380/30 |
| 5,191,613 A * | 3/1993 | Graziano et al. | 713/176 |
| 5,615,268 A | 3/1997 | Bisbee et al. | |
| 5,748,738 A | 5/1998 | Bisbee et al. | |
| 6,237,096 B1 | 5/2001 | Bisbee et al. | |
| 6,367,013 B1 | 4/2002 | Bisbee et al. | |
| 7,020,645 B2 | 3/2006 | Bisbee et al. | |
| 8,234,505 B2 * | 7/2012 | Anderson | 713/193 |
| 2003/0041239 A1 * | 2/2003 | Shear et al. | 713/156 |
| 2005/0097052 A1 * | 5/2005 | Systa et al. | 705/51 |

OTHER PUBLICATIONS

R. L. Rivest et al., "A Method for Obtaining Digital Signatures and Public-Key Cryptosystems," Communications of the ACM vol. 21, pp. 120 126, Feb. 1978.

(Continued)

*Primary Examiner* — Calvin L Hewitt, II
*Assistant Examiner* — John M Winter
(74) *Attorney, Agent, or Firm* — Ober, Kaler, Grimes & Shriver; Royal W. Craig

(57) ABSTRACT

Exemplary embodiments include methods of handling stored electronic original information objects that have been created by electronically signing information objects by respective authorized users and transfer agents, submitting signed information objects to a trusted repository system, validating the submitted signed information objects by at least testing the integrity of the contents of each signed information object and the validity of the signature of the respective transfer agent, and applying to each validated information object a date-time stamp and a digital signature and authentication certificate of the trusted repository system that is an electronic vault. One method includes the remote signing of electronic documents without the trusted repository ever releasing the electronic original documents and other information objects that are controlled and protected by the trusted repository system. Other methods include handling information objects that are transferable records according to specified business and government rules.

34 Claims, 4 Drawing Sheets

(56) References Cited

OTHER PUBLICATIONS

M. E. Hellman, "The Mathematics of Public-Key Cryptography", Scientific American, vol. 234, No. 8, pp. 146 152, 154 157; Aug. 1979.

W. Diffie, "The First Ten Years of Public-Key Cryptography", Proceedings of the IEEE, vol. 76. pp. 560 577; May 1988.

C. E. Shannon, "Communication Theory of Secrecy Systems", Bell Sys. Tech. J vol. 28, pp. 656 715; Oct. 1949.

C. R. Merrill, "Cryptography for Commerce—Beyond Clipper", The Data Law Report, vol. 2, No. 2, pp. 1,4 11; Sep. 1994.

* cited by examiner

Figure 2

| Creation of Authoritative Copy | | |
|---|---|---|
| Document Preparation | Signature Capture | Create Authoritative Copy |
| • Collect contract data for document | • Retrieve wrapped document from TRS | • Authenticate user and check user authorizations |
| • Merge data into document template from library | • Present document for user review | • Receive and verify integrity of multimedia electronic signature block |
| • Assign signature insert signature lines/blocks into populated document | • When user indicates that they are ready to sign, display signature page or pop-up window with visual control buttons | • Retrieve and verify integrity of TRS held and controlled electronic original document |
| • Assign Tag# to each signature line/signature block | • Capture multimedia electronic signature using attached peripheral device. | • Place signature block into electronic document if appropriate, else place separately in wrapper containing authoritative copy of electronic document |
| • Present user with copy to review | | |
| • Assign account # and doc ID to the electronic document | • Add multimedia signature, user name, date & time, reason for signing to signature block identified by account#, docID, signature tag# | • Add date & time |
| • Place prepared document into wrapper and send to TRS for tamper sealing using account number and docID as reference | • Add appropriate instruction and hash, wrap and send the multimedia electronic signature block to Application Server for validation and application to authoritative copy | • Compute hash over the electronic document, all multimedia electronic signature blocks, and the current date & time. |
| | | • Digitally sign the hash using the TRS digital signature. |
| | | • Store and version the wrapped electronic original documents in TRS secure storage |
| • Add audit trail entry | • Hash may additionally be digitally signed by transfer agent | • Add audit trail entry |

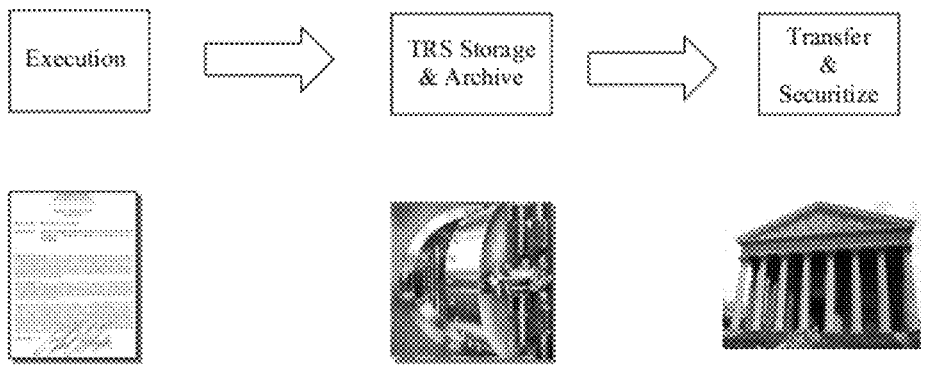

Figure 3

Primary Trusted Repository System Capabilities

- Remote Signing using multiple means for applying multimedia electronic signatures
- Tamper sealed electronic original documents having a verifiable trail of evidence
- Create authoritative copy of electronic original documents and other information objects that never leaves the control and protection of the Trusted Repository System
- Creation of review copies of the Authoritative Copy of Electronic Original Documents
- Creation of certified copies of the Authoritative Copy of Electronic Original Documents
- Paper-out (not recommended)
- Transfer-of-Ownership within the Trusted Repository System
- Transfer-of-Location & Custody between a $1^{st}$ TRS and a $2^{nd}$ TRS

Figure 4

SYSTEM AND METHOD FOR ELECTRONIC TRANSMISSION, STORAGE, RETRIEVAL AND REMOTE SIGNING OF AUTHENTICATED ELECTRONIC ORIGINAL DOCUMENTS

CROSS REFERENCE TO RELATED APPLICATIONS

The present application derives priority from U.S. Provisional Patent Application 61/284,042 filed on Dec. 11, 2009 which is incorporated herein by reference.

BACKGROUND OF THE INVENTION

1. Field of the Invention

The present invention relates generally to systems and methods for providing a verifiable chain of evidence and security for the transfer and retrieval of electronic documents and other information objects in digital formats.

2. Description of the Background

The evolution of methods of commerce is evident in the increasing replacement of paper-based communications with electronic communications. With paper based documents the traditionally accepted methods of verifying the identity of a document's originator or executor for legal purposes include an original, blue-ink signature, the physical presence of the signor and/or a personal witness or Notary Public acknowledgment. When documents are prepared and communicated electronically such as by e-mail, facsimile machine or electronic data interchange the traditionally accepted methods are not possible as there no longer exists an original hand written signature or notary's raised seal to authenticate the identity of a party to a transaction. Further, unlike the words of a document that are largely fixed on a page in a human readable format, the content of an electronically prepared, communicated and executed document are stored in a machine readable format that is more prone to alteration and tampering after execution.

To address these problems with electronic documents, a third-party operated Trusted Repository System (TRS) has been described that provides the needed security and protection of electronic documents and veracity of signatures. The system advantageously utilizes an asymmetric cryptographic system that help to ensure that a party originating or executing an electronic document is identifiable as such and that protects the integrity of electronically stored documents and other information objects during and after execution. This system is one aspect of the methods and apparatus for secure transmission, storage, and retrieval of information objects that are described in U.S. Pat. Nos. 5,615,268, 5,748,738, 6,237,096, 6,367,013 and 7,020,645 to Bisbee et al. which are expressly incorporated herein by reference.

As an initial matter, it will be helpful to understand the following terminology that is common in the field of secure electronic commerce and communications:

Public key cryptography (PKC) is a cryptographic technique that uses a pair of "keys," one public and one private, that are associated with a specific individual. The private key is maintained in secret by the individual. The public key is published for anyone to use for encrypting information intended for the individual. Only the holder of the paired private key can decrypt and access information encrypted with the public key. Conversely, the holder of an individuals public key can decrypt and access information encrypted by the individual's private key. The encrypt and decrypt functions of the two keys are truly "one-way," meaning that it is not possible to determine a private key from the corresponding public key, and vice-versa, due to the fact that it is currently computationally easy for a computer to identify large prime numbers but extremely difficult for a computer to factor the product of two such large prime numbers.

The one-way characteristic of a PKC system also enables a private key holder to "digitally sign" an electronic document by creating a "hash" of the document itself and then encrypting the hash with the private key and appending the encrypted hash (now referred to as a digital signature) to the original document. The hash is produced by applying an algorithm to the document to be digitally signed, the results of which correspond directly to the document so that the slightest change in the document itself will result in a change in the hash. On receipt, a public key holder can verify a signature by decrypting the hash and comparing the decrypted hash to a newly computed hash of the document. If the two hashes match the recipient can be assured that the signer was in possession of the private (secret) key and is thus presumably whom they purport to be. Comparison of the newly computed hash to the decrypted hash also verifies that the document itself has not been altered since it was signed. If the new hash matches the original hash decrypted with the public key then the recipient can be assured that the document itself has not been altered as even the slightest change in the document itself will result in the two hashes not matching. Example PKC algorithms that comply with government and/or commercial standards include the digital signature algorithm (DSA/RSA) and secure hash algorithm (SHA-1/MD5).

Various aspects of public-key cryptographic (PKC) systems are described in the literature, including R. L. Rivest et al., "A Method for Obtaining Digital Signatures and Public-Key Cryptosystems," Communications of the ACM vol. 21, pp. 120 126 (February 1978); M. E. Hellman, "The Mathematics of Public-Key Cryptography", Scientific American, vol. 234, no. 8, pp. 146 152, 154 157 (August 1979); and W. Diffie, "The First Ten Years of Public-Key Cryptography", Proceedings of the IEEE, vol. 76, pp. 560 577 (May 1988), each of which are incorporated herein by reference. It can also be noted that a PKC system's strength, i.e., the computational effort needed to break the encryption, depends to a great extent on the length of the key, as described in C. E. Shannon, "Communication Theory of Secrecy Systems", Bell Sys. Tech. J. vol. 28, pp. 656 715 (October 1949) which is also incorporated herein by reference.

A "digital signature" is a cryptographically created data element that is logically associated with, applied or otherwise appended to an electronic document with the intent of the creator to indicate their assent to the information contained in the document or their willingness to be otherwise bound by the terms or conditions recited in the electronic document. As described, a digital signature is typically created by "hashing" an electronic document and encrypting the resulting hash (integrity block) using the signor's private (secret) key and thereafter appended to the electronic document.

A "holographic signature" is a digitization of a handwritten or mechanical signature that has been electronically captured, e.g., by using a stylus, touchpad/touch screen or scanner, to create a bit image of the handwritten signature that is logically associated with, applied or appended to an electronic document with the intent of the creator to indicate their assent to the information contained in the document or their willingness to be otherwise bound by the terms or conditions recited in the electronic document. Common digitized signature file formats include, without limitation, .TIFF, .GIF, .JPEG and .BMP files.

A "voice signature" is a digitized audio recording of an individual's spoken statement that is logically associated with, applied or appended to an electronic document with the intent of the creator to indicate their assent to the information contained in the document or their willingness to be otherwise bound by the terms or conditions recited in the electronic document. Common audio file formats include, without limitation, .acc, .aif, .iff, .mp3, .mpa, .ra, .wav and .wma files.

A "video signature" is a digitized video recording of an individual's image and spoken statement that is logically associated with, applied or appended to an electronic document with the intent of the creator to indicate their assent to the information contained in the document or their willingness to be otherwise bound by the terms or conditions recited in the electronic document. Common video file formats include, without limitation: .3g2, .3gp, .asf, .asx, .avi, .flv, .mov, .mp4, .mpg, .rm, .swf, .vob and .wmv files.

A "biometric signature" is a digitally captured representation of a physical characteristic that uniquely identifies an individual, such as a finger print, facial scan or retinal scan, which is logically associated with, applied or appended to an electronic document with the intent of the creator to indicate their assent to the information contained in the document or their willingness to be otherwise bound by the terms or conditions recited in the electronic document. Common biometric file formats include, without limitation, XCBF and CBEFF files. An implanted "radio tag" or "microchip" may in the future be used in the identification and signature process.

A "mechanical signature" is any text, character(s), symbol(s), stamp(s), Hanko(s), seal(s) or image(s) executed or adopted by an individual that is logically associated with, applied or appended to an electronic document with the intent of the creator to indicate their assent to the information contained in the document or their willingness to be otherwise bound by the terms or conditions recited in the electronic document.

An "electronic signature" is any one of the mechanical, holographic, digital, voice, video or biometric signatures, or such other electronic sound, symbol, picture, or process that is logically associated, applied or attached to an electronic document with the intent or commitment of the signer to sign or otherwise be bound by the terms of the electronic document. Electronic signatures may contain additional information about the signer (e.g. name, email address etc.) and the signing event (e.g. reason, date and time, place etc.).

An "authentication certificate" is an unforgeable data element that binds an individual's public key to the individual's identity information and that advantageously, but not necessarily, conforms to the international standard X.509 version 3, "The Directory-Authentication Framework 1988", promulgated by the International Telecommunications Union (ITU). Authentication certificates are issued by a Certificate Authority (CA) that is a known entity and is responsible for ensuring the unique identification of all of its users and both source and content integrity of the information contained in the certificate. An authentication certificate is created when a CA uses its own private key to digitally sign (i.e. hash and encrypt) an individual's public key along with certain of the individual's indentifying information (name, location etc.) and certain information regarding the certificate itself (issuer, expiration date etc.). The act of digitally signing by the CA makes a certificate substantially tamper-proof such that further protection is not needed. The intent of the certificate is to reliably associate (bind) a user's identity to the user's public cryptographic key.

Each authentication certificate includes the following critical information needed in the signing and verification processes: a version number, a serial number, an identification of the Certification Authority (CA) that issued the certificate, identifications of the issuer's hash and digital signature algorithms, a validity period, a unique identification of the user who owns the certificate, and the user's public cryptographic signature verification key. Certificate extensions can also be used as a way of associating additional attributes with users or public keys, and for managing the public key infrastructure certificate hierarchy. Guidance for using extensions is available in the recommendations of ITU X.509v3 (1993)/ISO/IEC 9594 8:1995, "The Directory: Authentication Framework" or in IETF Internet X.509 Public Key Infrastructure Certificate and CRL Profile<draft-ietf-pkix-ipki-part1-11>.

An individual's authentication certificate is advantageously and preferably appended to an electronic document that the individual has digitally signed with the individual's private key so that it is possible to verify the digital signature by decrypting the individual's public key with the known and trusted CA's public key. Alternatively, the certificate may be retrieved from the issuing CA or directory archive.

The "Public Key Infrastructure (PKI)" is the hierarchy of CA's responsible for issuing authentication certificates and certified cryptographic keys used for digitally signing and encrypting information objects. Certificates and certification frameworks are described in C. R. Merrill, "Cryptography for Commerce—Beyond Clipper", The Data Law Report, vol. 2, no. 2, pp. 1, 4 11 (September 1994) and in the X.509 specification, which are expressly incorporated herein by reference.

A "multimedia signature block" is a data element that holds at least one electronic signature, and appropriate identification and use information. A multimedia signature block includes at least signer information (typed name), signer's electronic signature, hash computed over the information object and electronic signature, signature placement information and the signer intent.

Multimedia signatures are those electronic signatures that are not renderable in human readable form.

An electronic "wrapper" is a "container" used to securely hold and associate electronic signatures with part or all of one or more electronic information objects contained therein. Wrappers may take the form of any open standard enveloping or information object (document) formatting schemas. Two examples are the RSA's Public Key Cryptographic Standard (PKCS) #7 and the World Wide Web Consortium's (W3C) Extensible Markup Language (XML-DSig) Digital Signature Syntax and Processing Recommendation. The RSA PKCS #7 standard supports zero, one, and multiple parallel and serial digital signatures (cosign and countersign). PKCS #7 supports authenticated and unauthenticated attributes that are associated with the signature block. A signer's digital signature is usually computed over the hash of the information object and authenticated data. An unauthenticated attribute is not protected.

Exemplary wrapper formats include IETF's Privacy Enhanced Mail (PEM), IETF's Secure/Multipurpose Internet Mail Extensions (S/MIME); W3C's HyperText Markup Language (HTML), Extensible Hypertext Markup Language (XHTML) and Extensible Forms Description Language (XFDL), and Adobe's Portable Document Format (PDF). Any of these wrapper formats can be applied recursively and markup languages extended to provide signature and protection layering.

SUMMARY OF THE INVENTION

Applicants' inventions solve the problems suffered by prior approaches to creating an electronic original that is the authoritative copy of an electronic document or information object. Applicants' invention provides a system and method for securely signing stored electronic original information objects without the trusted repository system (TRS) ever relinquishing control of the authoritative copy of the electronic original information object or document. Receipt of validated instructions results in the TRS creating and distributing a copy of the electronic original information object for execution. Any such copies of the electronic original information object must contain at least one forgery-resistant indicium or watermark that clearly identifies the rendered information as a copy of the electronic original information object held at the TRS. The receiving remote client application displays the marked copy and supports the remote signing event. One of a variety of supported multimedia signing means is used to create an electronic signature that is returned to the TRS in a multimedia supporting electronic signature block for inclusion with the electronic original. Additional information such as the document identifier, signature line tag, signer name, rationale for signing, the signature type and placement, and other information needed to properly document the signing event may also be included in the electronic signature block. The TRS retains the multimedia electronic signature block separately as well as applying the electronic signature block or extracting and applying the electronic signature and other required field(s) to the electronic original information object. The TRS then applies a current date-time stamp and its own digital signature and current authentication certificate. One or more electronic signatures blocks can be separately added to the electronic original information object using this method.

DESCRIPTION OF THE DRAWINGS

The objects, features, and advantages of the present invention will become apparent from the following detailed description of the preferred embodiments and certain modifications thereof when taken together with the accompanying drawings in which like numbers represent like items throughout and in which:

FIG. 2 is describes the step by step process used to create an electronic original document that never leaves the control or is disclosed by the Trusted Repository System.

FIG. 3 describes the advantage of fully secure electronic business transactions.

FIG. 4 is a discloses a list of the primary Trusted Repository Capabilities

DETAILED DESCRIPTION OF THE PREFERRED EMBODIMENT

Figure 1:
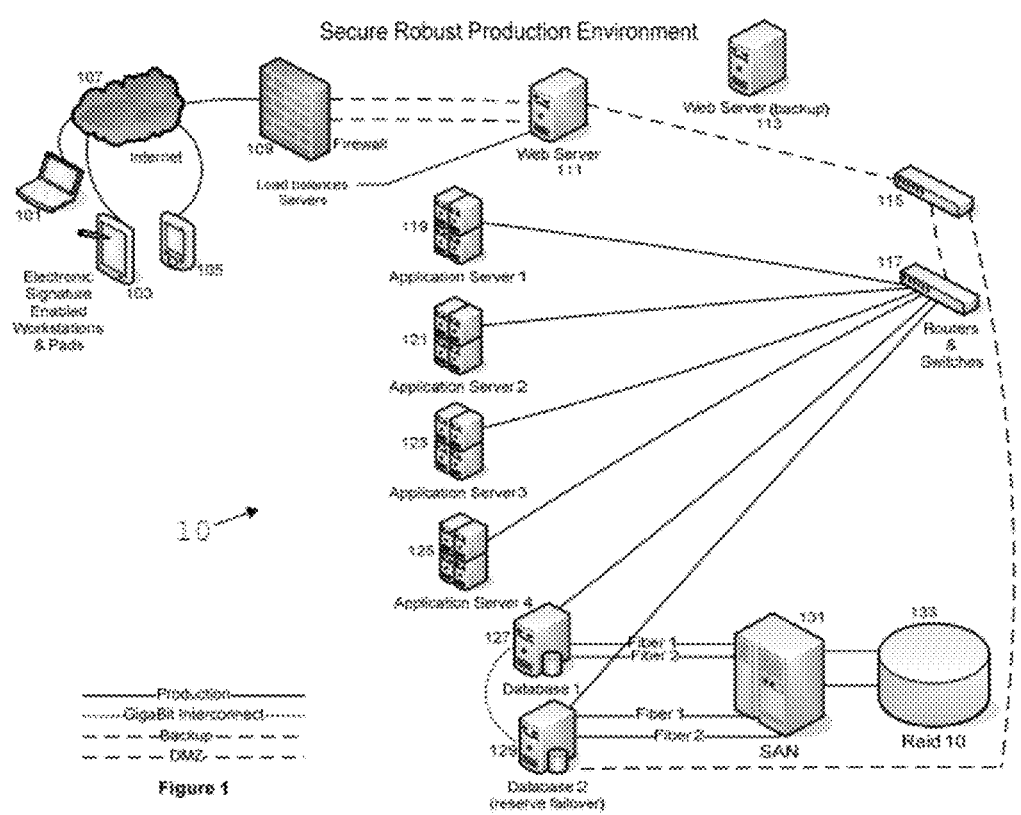
FIG. 1 is a schematic view of a trusted repository system architecture.

Applicant's invention can be implemented utilizing commercially available computer systems and technology to create an integrated closed system for authentication of electronic documents and other information objects, as will be defined below. With reference to FIG. 1, a diagram of a high availability, secure trusted repository system architecture is provided that insures the security of the authoritative copy of an electronic document and any affixed electronic signatures or information. All computing component behind the firewall 109 are housed in a physically secure facility and make up the components of the trusted repository system (TRS) 10. Strong authentication is required for client workstations and devices to access the TRS 10 and no TRS resource can be accessed directly. Authorized instructions that may accompany payloads (e.g. electronic documents, electronic multimedia signature blocks, etc.) are required to request and receive TRS services.

An Internet browser and multimedia electronic signature capture enabled client-side application running on a workstation such as a laptop 101, pad 103, PDA 105 or desktop machine (not-pictured) equipped with electronic signature means is provided for client access to the TRS 10. Exemplary multimedia electronic signature means include touch sensitive pads and screens that capture handwritten signatures; cryptographic devices or software that use certificates and private keys to create and verify digital signatures; biometric devices that can scan and record fingerprints, facial or retinal imprints; and other devices that can record voice, image or video. Such devices allow the party using the client workstation to apply their multimedia electronic signature to the currently displayed electronic document.

The workstation transmits a request protected by SSL protocol via the Internet 107 or other data network to the firewall 109 which forwards the request to a Web server 111, 113. The Web server 111 acts on the request and forwards the instruction and/or payload to any available application server 119, 121, 123, 125. The application server performs the requested actions, applying, storing, retrieving, auditing, sealing, authenticating, etc. electronic information objects that are stored and retrieved using DBMS 127, 129. Actual storage media is managed by storage area network 131 and attached raid array 133. The TRS 10 necessarily performs all requested authorized actions without ever disclosing the actual authoritative copy of the electronic document and attached multimedia signatures blocks, as will be described below. The TRS 10 provides centralized support for a distributed network of clients and supports a wide range of present and future e-commerce applications by providing a secure, standards-based foundation upon which business applications can be and are built.

An "electronic document" as the term is used herein is any form of electronically produced or stored text, image, video recording, audio recording computer source code, computer executable code, database, data compilation or other electronic data that can be submitted to the TRS as or to become an authoritative copy as will be described. In perhaps its most common incarnation and the exemplary form in this application, an electronic document takes the form of an electronically produced or stored text that contains, for example, the terms of a contract or purchase order. It should be observed that the term is not so limited and is intended to encompass any discrete data form.

The terms "information object" or "electronic information object," used interchangeably herein, include any form of discrete electronic data that could be submitted to the TRS for storage as or to become an authoritative copy or in conjunction with such authoritative copy. An information object can be recursive in that it may include one or more other information objects within it. Thus an information object can be an electronic document as well as one or more date-time stamps, signature blocks, digital signatures and matching certificates, electronic signatures, electronic originals, instructions, audit trails, wrappers and information related to the same, all wrapped or unwrapped. Without limitation, a common information object includes at least one wrapper or container holding an object ID, electronic document, signature block, instruction, and a table of related information where such related information is appropriate and available. It is noted that such a common information object does itself contain additional information objects.

Figure 5:
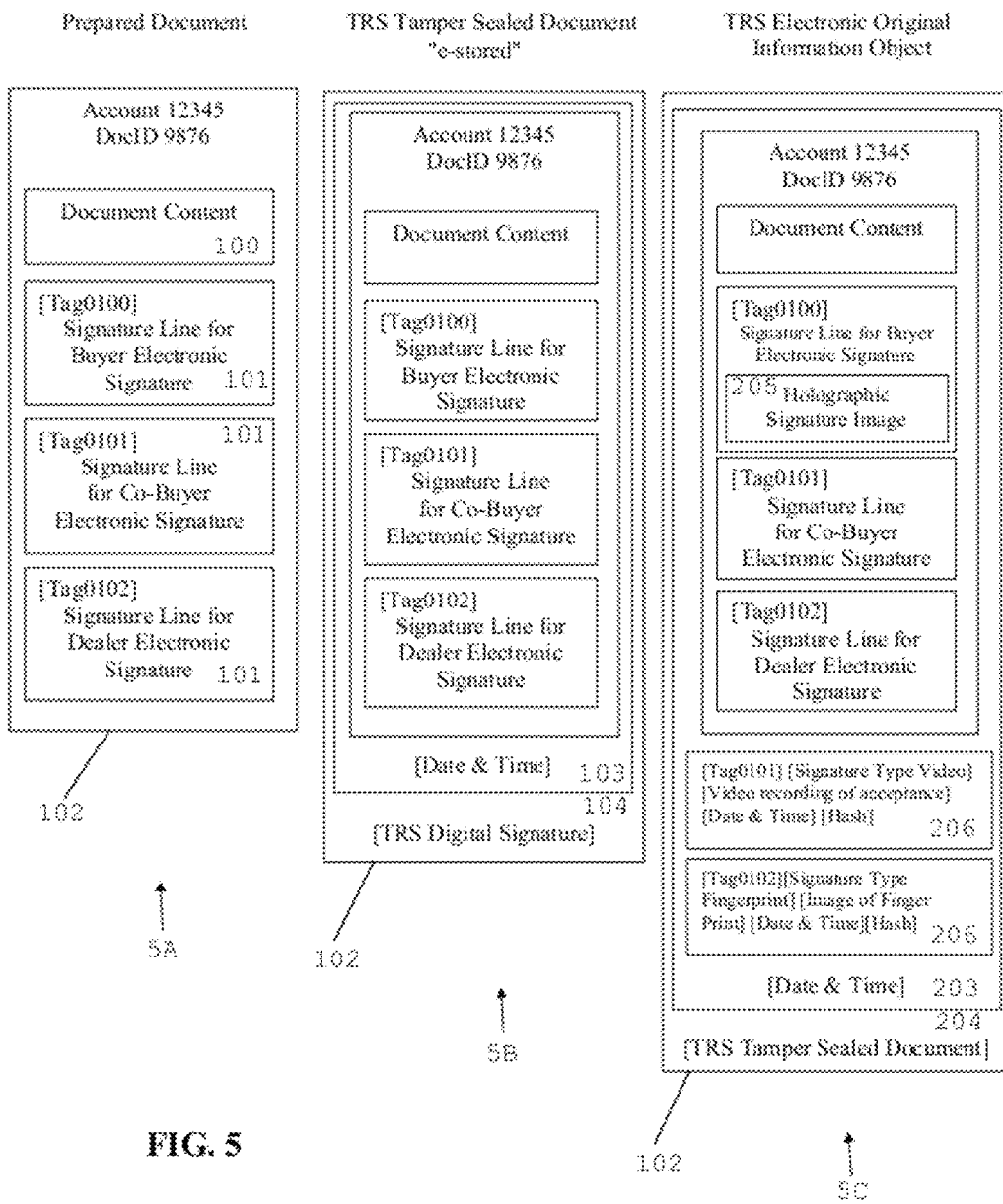
FIG. 5 is a schematic view of an information object and wrapper.

With reference to FIG. 5 generally and specifically to 5A, as an initial step, an electronic document (or documents) 100 that is ready for signature is created or identified by a transfer agent and may be, as described, in any form including a text document prepared by any conventional word processor or publishing software such as Microsoft Word or Adobe Acrobat. The document may have one or more (blank) signature lines 101 within the document An electronic document's originator and any subsequent submitter of information objects are referred to as transfer agents and attest to the integrity and validity of an information object before it is submitted to a TRS. A transfer agent is authorized to submit information objects such as the electronic document to the TRS 10, typically using a workstation such as laptop 101, pad 103, or PDA 105 or a desktop or similar system. It will be appreciated that a transfer agent is identified to the TRS by the possession and use of a valid user ID and password or, where stronger authentication is required, an authentication certificate and private key. As noted, the authentication certificate also contains one or more additional identifying attributes of the transfer agent. The TRS access database may also contain additional transfer agent attributes such as system access rights and capabilities.

With reference to 5B, before submission to the TRS by the transfer agent the electronic document may, in certain embodiments, be digitally signed by the transfer agent and/or formatted into an information object that includes suitable instructions for parsing and processing its contents (i.e. a syntactically encoded file 102. A convenient form of wrapper (e.g., PEM, RSA PKCS#7, or S/MIME), a markup language (e.g., HTML, XML, or XFDL) or a word processor incorporating features that support electronic signatures (Microsoft Word, Adobe PDF) can be used for this purpose, collectively, generally referred to as a syntactically encoded file.

The TRS validates the transfer agent's identity and rights and verifies the integrity of submitted information object. Use of electronic signatures by the transfer agent when submitting information objects to the TRS directly supports validation of both transfer agent identity and information object content integrity. Once it is determined that an information object has not been altered prior to or during submission and that the information object's transfer agent has the proper authorizations, the TRS assumes custody and control of the information object and responsibility for the information object's preservation by applying a tamper seal. The tamper seal is applied by appending a current date-time stamp 103 to the submission and applying the TRS's digital signature 104 to the submission so appended. The date-time stamp can take any convenient form and is analogous to the simple rubber stamp available in many mail rooms. The digital signature applied by the TRS eliminates the possibility of unauthorized, undetected alteration or tampering with an information object by the signatories subsequent to its original submission, execution or sealing. In addition, the TRS's digital signature can advantageously provide for non-repudiation, i.e., precluding the originator from disavowing the information object.

A "store document" instruction received by the TRS from the transfer agent along with the submitted information object causes the TRS application server 119 to place part or all of the information object in the wrapper that is tamper sealed using the TRS's digital signature. As described, the tamper seal prevents unauthorized modification from going undetected and may preferably be applied by hashing the information object and encrypting the hash using the TRS's private key. Wrapper 102 formats that may be used include, but are not limited to, PKCS #7, S/MIME and XML envelop format syntaxes. The wrapped, tamper sealed electronic document is then stored in the TRS database server 127. The electronic document's status is action (storage) is recorded in the TRS's audit trail for the information initialized to "e-stored object" if no signer's electronic signature has yet been applied and this object.

The term "electronic original information object" is used herein to refer to an authoritative copy of the information object and indicates that at least a first designated signer's electronic signature has been applied. Electronic original information objects may be, but are not necessarily a transferable record as described below. The term "transaction" will be used to refer to a transaction or set of legally enforceable obligations that corresponds to or are defined by one or more electronic original information objects. It will be understood that an electronic original information object is itself an information object and that the underlying formatting of an electronic original information object enables parsing and processing for performing verification and validation of one or more of the applied electronic signatures, and extraction of the original contents for viewing or processing. When an information object is first electronically signed thus becoming an electronic original information object, the stored electronic original information object status is set to "e-original object" and the action is recorded in the TRS's audit trail for the information object. Other status indicators employed by the TRS to identify other information object states such as "versioned object" as will be described.

The signing event is initiated by the electronic document's owner or transfer agent either through direct communication with the transaction participants or through an instruction to the TRS to send a URL, user name and security code to the transaction participants intended to sign an electronic document (a "signer"). On receipt of such a communication or instruction, a signer opens an Internet browser at any local client workstation and uses the URL provided to establish an SSL connection to the TRS. The signer than logs in and authenticates themselves to the TRS by entering their assigned user name and security code, and optionally configures his signature. The system then creates a "view copy" of each of the documents that the transfer agent or documents' owner has designated to be signed or viewed by the signer for the signer's review and, in the case of a document designated to be signed and where the signer wishes to sign, signature. Thus, the present invention contemplates that the TRS may be used to maintain secure original versions of not just contracts, agreements or other documents requiring signature, but documents that need only be reviewed by the user without application of a signature (i.e., disclosure documents required by law to accompany a consumer loan such as those disclosure documents required under the Truth in Lending Act). The system may display "view copies" of documents in the order in which the transfer agent or owner has designated that they be viewed and/or signed. Once a given document is signed, the system will display a "view copy" of the next document that has been selected for signing or viewing by the signer, and will continue this process for each successive document that the transfer agent or owner has selected. The system displays only those electronic documents previously authorized by the owner or the transfer agent for review and/or execution by the particular signer. For each document, the TRS application server retrieves a copy of the requested electronic document from secure database management system (DBMS). The TRS then prepares it for delivery to and rendition by the signer's Internet browser enabled client-side application. The retrieved electronic document is, of course, an information object and may already be an electronic original information object if at least one signature has been applied. It must be remembered that an actual electronic original information object never leaves the control of the TRS.

A multistep preparation process is required to prepare the information object for rendition and signing at the signer's local workstation. As noted, a copy of the stored, tamper sealed information object is made and the tamper seal is validated and then removed from the copy. A visual watermark is applied to the copy that unmistakably discloses that the information object is a copy of a stored document that is or will become an electronic original information object held at the TRS. A watermark may also disclose that the signer's electronic signature will be sent to the TRS to be applied to the electronic original information object which is or becomes the authoritative copy of the document by the addition of such signature(s). These steps insure that the signer does not mistakenly believe that the rendered document is the authoritative copy of the electronic original held at the TRS.

The TRS may include in a wrapper with the retrieved information object any previously added multimedia signature blocks for viewing by subsequent signers according to instructions provided by the owner of the information object when the owner's account was initially created or when the document was first stored. Renderable signatures such as mechanical or holographic signatures are preferably placed in the electronic document so as to be appropriately rendered when the document is displayed to the signer. Signatures types that are not supported within the document or are otherwise not renderable, such as, potentially, audio and video signatures, are appended within the wrapper and a normalized indicator of the signature is rendered within the document that may preferably link to the appended multimedia signature. Owner instructions dictate if and how previously added multimedia signature blocks are to be displayed and may be applied to a single electronic document, to a defined subset of documents or to all of an owner's electronic documents. Display options include, without limitation, graying or blacking out some or all other signature blocks, displaying captured written signatures, displaying the names of previous signers in text or placing an anchor link on the signature line that enables the display or playback of multimedia signature information. The electronic document may preferably be flattened such that multiple layers containing previously added electronic signatures are contained in a single information object.

At least one multimedia signature block is provided to be populated with the signer's electronic signature and such other related information as is required by the electronic document owner. A multimedia signature block template is added to the electronic information object containing the watermarked electronic document, the template being preferably selected by the TRS based on which electronic signature means will be employed in the signing event based on capabilities of the signer's workstation communicated to the TRS by the client-side application. The information requirements of the electronic document's owner also serve to format a multimedia electronic signature block template file. Alternately, the TRS may maintain the template file and associate it with the electronic document based on received instruction. The template files allow the TRS to populate the correct signature line formats for insertion at appropriate tags or anchor points in the electronic document on receipt from the workstation and enables the designated electronic multimedia signature means interfaces. The client side workstation populates the template file with the electronic signature and other required information. For non-human readable signature types, the template file also allows the TRS to create a descriptive label that is later associated with the signature line after the signing event such as "Digitally Signed by . . . ", "Voice Signed by . . . ", "Fingerprint of . . . " etc. Once the electronic signature exists, clicking on the anchor point set at the start of the label will display or play the recorded signing event. For non-human readable multimedia signature such as audio or video, a pop up window and visual buttons are provided for viewing and playback.

The prepared copy of the electronic document, within a wrapper that, when owner authorized also contains any or all previously applied signatures and signature blocks and a template file, is sent securely via the Internet to the client workstation for rendition using an SSL connection. Where stronger assurance is required, the TRS computes the hash of the marked up copy of the electronic document sends both the copy and hash to the workstation where the signer's electronic signature is to be applied to assure that nothing is changed during transmission. Where yet stronger security is required guaranteeing that the information object received at the workstation originated at the TRS, the TRS applies its digital signature and certificate to the marked copy of the document to transmission. The workstation rejects the marked copy as fraudulent if the TRS's digital signature and certificate do not test as valid. The workstation notifies the TRS, reporting the problem and the TRS retransmitted the digitally signed marked copy of the electronic original information object. Appropriate actions are initiated by the TRS if the TRS didn't transmit the invalid marked copy.

The client-side application controls the execution steps required in applying the electronic signature. The signer is instructed to review the displayed electronic document and is then given the choice of refusing and exiting the application, or continuing to the signing event. If they choose to continue, the signer may be asked to position the cursor at their signature line. Conversely, this may be done automatically by the client-side application. For human readable signature types such as holographic or mechanical signatures, the touch sensitive signature means (pad, etc.) is used to capture the electronic signature that will be displayed on the signature line. This enables the signer to make visual verification that the signature was in fact captured. For other electronic signature types a pop up window with appropriate visual buttons, such as starting and stopping of audio or visual recordings, may be displayed to conclude the signature event. In addition to the multimedia electronic signature and the local date-time, other attributes such as reason for signing and place of signing may be appropriately placed in the multimedia electronic signature block that will be returned to the TRS.

After the signature event is concluded the client-side application discards the copy of the watermarked electronic document and returns only the multimedia electronic signature block and an instruction file to the TRS using the SSL connection. To insure the highest level of system trust, the remote transfer agent may be required to date-time stamp, digitally sign and affix its certificate to the multimedia signature block. In such an enhanced scenario the TRS will validate the transfer agent's digital signature and certificate before processing the electronic signature and associated information contained in the multimedia signature block and will reject electronic signature if the transfer agent's digital signature or certificate is invalid. The instruction file identifies, at a minimum, an "add signature" instruction, the electronic document to which the signature is to be added, the signature type and placement within the document along with any other relevant information required by the TRS to accurately render the document. With reference to FIG. 5C, on receipt the TRS 10 retrieves the information object which may contain or links to any previously applied multimedia electronic signature blocks, if any, from the secure DBMS 127, 129 and removes the tamper seal after verifying its integrity. The signature 205 and accompanying signing information conveyed in the signature block may be extracted and placed into the information object if the document syntax supports that electronic signature type directly. If not, the signature block 206 is placed into the wrapper that contains the information object, any previously applied signature blocks and the current date-time stamp 203. The term "applied" is used to include either possibility. A secure hash function is then computed over the electronic document, any previously applied multimedia electronic signature blocks and the newly received multimedia electronic signature block. The hash is digitally signed by the TRS using the TRS's private key thereby creating a new tamper seal. The electronic document, all applied digital multimedia signatures or links thereto, and the TRS's digital signature are placed in the security wrapper 102 and the wrapper is added to the TRS's secure DBMS as an electronic original information object and further the authoritative copy thereof. All information object storage events are logged in the audit trail.

The TRS stores the multimedia signature block in a table, encrypting the multimedia signature block if required. The TRS parses the multimedia signature block and where possible places the electronic signature in the electronic original information object. The TRS will also populate other fields supported by the file format of the electronic original information object. Adobe's Portable Document Format (PDF), as an example, supports signature type and appearance, reason for signing, and other hidden custom fields, one of which is used to hold a hash computed over the electronic signature. The TRS may then apply a date-time stamp, TRS's digital signature and certificate to the electronic original information object. When owner required, the new version of the electronic original information object is encrypted using an owner storage key. The storage key is used with a symmetric key algorithm such as the NIST approved Advanced Encryption Standard (AES). Each owner or owner organization has their own storage key that is used to protect their information objects that are held in TRS storage. Storage keys may be owner provided or, more preferably, uniquely generated by the TRS for each owner.

If the TRS accepts submissions created with different encryption, hashing, or digital signature algorithms or algorithm suites, as may be expected in order for the system to keep pace with changing techniques, then indicator(s) provided to the TRS by the client side application in the returned information object must at least identify the algorithm(s) and key size. It will be understood that if the TRS accepts submissions created with only one or a small enough number of algorithms, such formatting is not needed since the TRS will be able to simply test information objects with each permitted algorithm. Further, if a non-verifiable transfer agent signature is used, the transfer agent should be authenticated in another way, such as by communication session authentication, which can be achieved by requiring a combination of a user (transfer agent) identifier and a password or by a client authenticated secure sockets layer (SSL) protocol.

In certain embodiments of the invention where an enhanced record, audit trail or chain of evidence is desirable, version controls are applied to electronic original information objects in an account, thereby preventing direct modification of an electronic original information object. Versioning demotes the active authoritative copy and promotes a newly updated electronic original information object to the status of the authoritative copy when new signatures are added. All demoted prior versions of the electronic original information object are advantageously maintained and all activity is tracked to discourage fraud. The combination of the actions by the TRS and the a protected audit trail can be used at a future date to conclusively prove that a party initiated or assented to a transaction, thereby precluding an originator from denying that an electronic original originated with them and providing irrevocable proof of authenticity.

Secure audit, record tracking and management, and backup functions are further provided by the TRS for maintaining an electronic original information object. The TRS preferably stores the electronic original information object by account number and transaction ID, and controls access to an account by user-type for the benefit of the account owner. The account owner specifies the set of activities that are permitted with respect to electronic original information objects stored in their account. Accounts may be further grouped by organization. The transaction ID may be viewed as virtual folders. Multiple electronic documents or information objects may be assigned to a transaction ID and logically grouped together. This feature facilitates grouping electronic original information objects with the other related electronic documents or information objects that where submitted during the transaction for ease of access and review. The electronic original information objects are stored and the corresponding accounts are maintained by the TRS in any convenient form of memory, such as on optical and/or magnetic disks. Once a transaction is completed and the associated electronic original information object(s) are created by the TRS, the set of authorized parties who can access the TRS to obtain or further transmit an electronic original information object may change.

The TRS can create a paper or electronic certified copy of an electronic document or an electronic original information object. A watermark is added to the electronic document that states that the copy is a certified copy of the authoritative copy held and controlled at the TRS. Where the certified copy is printed to paper the electronic document is flattened by combining the various layers including the watermark to form a single later information object. Human readable electronic signatures are populated at the appropriate signature line if not already present. Non-human readable signatures are replaced with the text version of the signer's name and the date and time of signing. Where the certified copy is electronic, an anchor point link at the start of each multimedia signature line permits the display or playback of any attached multimedia electronic signature blocks. The owner of the electronic document may instruct the TRS to add other available information in text form when generating certified copies of electronic documents.

The certified copy means may also be used by the electronic document owner to "export to paper" an authoritative copy of one or more the electronic original information objects related to a particular transaction. An instruction to "export to paper" a document or information object preferably must be digitally signed using the owner's private key and certificate issued by a CA registered with the TRS because the security controls of the TRS are irretrievably lost in the process. Electronic original information objects that have been exported to paper bear a watermark that states that the paper document is the authoritative copy of the electronic original previously held by the TRS and that provides the date and time of creation. The TRS can batch export to paper if the owner submits an instruction file that lists the electronic original information objects to be exported to paper. A version of a electronic original information object that has been exported to paper may be maintained by the TRS but is no longer the authoritative copy. Alternately, all versions may be removed.

The process of generating electronic original information objects can provide the evidence necessary to establish the transfer of interests in a "transferable record" since it reliably establishes a document's issuer/owner as the person to which the transferable record was issued or transferred. A "transferable record" means an information object, an interest in which the owner/issuer has expressly agreed is transferable. Specifically, a single authoritative copy of the electronic original information object of the transferable record exists which is unique, identifiable, and unalterable. Copies or revisions of the authoritative copy of the electronic original information object comprising a transferable record that add or change an identified assignee of the transferable record can be made only with the consent of the person asserting control.

The TRS asynchronously performs a transfer of ownership of the authoritative copy of the transferable record at the electronic original information object owner or transfer agent's authenticated instruction. The instruction must again be digitally signed using the private key and certificate issued by a CA registered with the TRS. The buyer of the information object is given the ability to review the subject electronic document. The TRS initiates the transfer, but the buyer must accept or reject the transfer. The information object is locked until completion of the transfer at which point it is moved to the buyer's storage area in the TRS. The TRS confirms completion of the transfer with the prior owner and buyer and logs each step in the audit trail. The TRS can batch transfers if the owner submits an appropriate instruction file that lists the electronic original information objects and the respective buyers.

The TRS can asynchronously perform a transfer of the electronic original information objects' location and custody to another TRS or other electronic vault. The information objects' owner or transfer agent must have appropriate permission to initiate the request and the instruction must again be digitally signed using the private key and certificate issued by a CA registered with the TRS. When an authorized transfer instruction is received, the sending TRS initiates an internal export and builds a data compression and file archive, such as a zip file, by adding the electronic original information object, other related information objects and all respective audit trail entries. The zip file may be digitally signed and or encrypted by the sending TRS where tamper and or disclosure protection is required. The TRS sends the zip file and its X.500 certificate to the receiving TRS or other electronic vault. A data compression and file archive is employed by the TRS for all forms of approved export.

When the authorized owner or transfer agent instructs the TRS to perform an export to paper, transfer of ownership, or transfer of location and custody of multiple information objects; a manifest may be used that lists all information objects that need to be processed. Where two TRSs are involved manifests are exchanged at the beginning and end of operation. TRSs use the manifest to insure completion of all requested operations. TRSs may digitally sign and store the manifests and audit this event.

During an export to paper, transfer of ownership, or transfer of location and custody; all tamper seals are validated and processing stops if validation fails. Once remedial action is completed the process will resume at the point where it was interrupted.

Any transfer agents and other users who is required to digitally sign electronic documents or TRS instructions must be in procession of a PKCS#11 (hardware) or PKCS#12 (software) token. These tokens contain user private keys and X.500 certificates. Both tokens are accessed with a user ID and password. The issuing CA must be registered with the TRS. These tokens interface to the web application running on the local workstation and are used to compute any necessary digital signatures.

The TRS is capable of encrypting any electronic document or information object in storage. Where multiple organizations are hosted on the TRS, each organization is given its own separate partition. If an organization requires the TRS to encrypt any or all of their electronic documents, then only the specified electronic documents in their partition will be encrypted. The TRS advantageously uses cryptographic hardware accelerators to off-load computational processing.

Alternatively, the methods described above are followed, but only a reference pointing to the table location of the multimedia signature block is placed in the electronic original information object. The TRS then applies a date-time stamp, digital signature and TRS certificate to the electronic original information object. Again, if required by the owner, the new version of the electronic original information object is encrypted using owner or storage key.

The methods employed to create and apply the multimedia signature block are used when applying counterpart or multiple signatures to any electronic original information object. The above-described embodiment is for the purpose of promoting an understanding of the principles of the invention. It should nevertheless be understood that no limitation of the scope of the invention is thereby intended, such alternations and further modifications in the illustrated device, and such further applications of the principles of the invention as illustrated herein being contemplated as would normally occur to one skilled in the art to which the invention relates.

Having now fully set forth the preferred embodiment and certain alternatives of the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims and may be used with a variety of materials and components. This application is therefore intended to cover any variations, uses, or adaptations of the invention using its general principles. Further, this application is intended to cover such departures from the present disclosure as come within known or customary practice in the art to which this invention pertains.

We claim:
1. In a data processing system that includes at least one remote computer workstation, that is connected via a communications network to at least one trusted repository computer system consisting of at least one application server and at least one secure database management system, a method of electronic transmission, storage, retrieval and remote signing of an information object, comprising the steps of:
  submitting by an authenticated transfer agent from a remote computer workstation via said communications network an information object to said trusted repository system;
  applying by said trusted repository system a first tamper seal to at least a portion of said information object;
  storing by said trusted repository system said tamper sealed information object in a physically and electronically secure storage facility;
  receiving by said trusted repository system via said communications network an information object request instruction from an authenticated user at said remote computer workstation;
  creating by said trusted repository system a copy of said tamper sealed information object and verifying by said trusted repository system the integrity of said copy by validating said first tamper seal;
  marking by said trusted repository system said copy with a forgery-resistant indicia identifying said copy as a copy of said information object held at said trusted repository system;
  communicating by said trusted repository system said marked copy of said information object to said authenticated local user at said remote computer workstation via said communications network;
  applying by said authenticated user via said remote computer workstation an electronic signature to said marked copy of said electronic information object;
  communicating by said remote computer workstation said electronic signature to said trusted repository system via said communications network;
  applying by said trusted repository system said electronic signature to said tamper sealed information object whereby said information object is designated an electronic original information object by said trusted repository system;
  applying by said trusted repository system a second tamper seal to at least said electronic original information object and said electronic signature; and
  storing by said trusted repository system said tamper sealed electronic original information object and electronic signature in said physically and electronically secure storage facility.

2. The method of electronic transmission, storage, retrieval and remote signing of an information object of claim 1 wherein said first tamper seal and said second tamper seal are each a digital signature applied by said trusted repository system by the steps of
  applying a first date-time stamp to at least said information object and computing a hash of said submitted information object and any applied electronic signatures, together with said date-time stamp; and
  encrypting said hash with a private key of said trusted repository system and applying said encrypted hash to said information object, applied electronic signatures and date-time stamp.

3. The method of electronic transmission, storage, retrieval and remote signing of an information object of claim 1, wherein said step of storing said tamper sealed information object further comprises placing by said trusted repository system said information object into a first wrapper.

4. The method of electronic transmission, storage, retrieval and remote signing of an information object of claim 3, wherein said step of communicating said electronic signature to said trusted repository system further comprises the step of placing by said remote computer workstation at least said electronic signature and a first date-time stamp into a multimedia signature block.

5. The method of electronic transmission, storage, retrieval and remote signing of an information object of claim 4 wherein said step of applying by said trusted repository system said electronic signature to said tamper sealed information object further comprises the steps by said trusted repository system of
  retrieving said tamper sealed information object from said storage facility;
  removing said first wrapper;
  removing said first tamper seal; and
  applying said multimedia signature block and a second date-time stamp to said information object.

6. The method of electronic transmission, storage, retrieval and remote signing of an information object of claim 5, wherein said step of storing said tamper sealed electronic original information object by said trusted repository system further comprises placing by said trusted repository system said electronic original information object and said applied multimedia signature block into a second wrapper.

7. The method of electronic transmission, storage, retrieval and remote signing of an information object of claim 4, wherein said second tamper seal is a digital signature applied by said trusted repository system by the steps of
  applying a first date-time stamp to said information object and computing a hash of said time stamped information object together with said multimedia signature block; and
  encrypting said hash with a private key of said trusted repository system and applying said encrypted hash to said electronic original information object.

8. The method of electronic transmission, storage, retrieval and remote signing of an information object of claim 4, wherein said first tamper seal and said second tamper seal applied to said electronic information objects by said trusted repository system are verified every time said trusted repository system accesses said information objects to ensure that said information object has not been altered in any way.

9. The method of electronic transmission, storage, retrieval and remote signing of an information object of claim 4, wherein said electronic signature is placed by said trusted repository system directly into said electronic original information object.

10. The method of electronic transmission, storage, retrieval and remote signing of an information object of claim 6, wherein said remote computer workstation communicates a syntactically encoded signature instruction file, said instruction file containing
  an information object identifier,
  a signature line tag,
  a signature block identifier,
  a signer name,
  a signature type,
  a reason for signing,
  a base 64 encoded electronic signature, and
  a MIME type;
  wherein said encoded multimedia information object contains at least one electronic signature.

11. The method of electronic transmission, storage, retrieval and remote signing of an information object of claim 10, wherein said electronic signature is selected from the group consisting of a biometric signature, a digital signature, a holographic signature, a mechanical signature, a voice signature and a video signature.

12. The method of electronic transmission, storage, retrieval and remote signing of an information object of claim 10, wherein said trusted repository system parses said syntactically encoded signature instruction file for said base 64 encoded electronic signature, including the steps of
   computing a hash of said base 64 encoded signature;
   storing said computed hash in a table separate from said information object; and
   creating a multimedia signature block with said information object identifier, signature line tag, signature block identifier, signer name, signature type, reason for signing, base 64 encoded electronic signature, and a hidden custom property that includes at least said computed hash.

13. The method of electronic transmission, storage, retrieval and remote signing of an information object of claim 12, wherein said multimedia signature block is stored by said trusted repository system separate from the electronic original information object and only a link to said multimedia signature block is added by said trusted repository system to said electronic original information object.

14. The method of electronic transmission, storage, retrieval and remote signing of an information object of claim 13, where said trusted repository system applies its own digital signature inside said wrapper using a hash computed over said electronic original information object, said multimedia signature block and any previously received multimedia signature blocks.

15. The method of claim 14, wherein said trusted repository system applies said second tamper seal by the steps of:
   applying a current date-time stamp to said electronic original information object;
   computing a hash over said stamped electronic original information object and all submitted multimedia signature blocks;
   encrypting said hash using trusted repository system private key and appending said encrypted hash, matching certificate and public key to said electronic information object; and
   wrapping and storing the tamper sealed electronic original information object in a secure database management system of said trusted repository system.

16. The method of claim 15, wherein said second tamper seal securely binds said multimedia signature blocks to said electronic original information object and allows for detection of any attempt to alter the electronic original information object, multimedia signature blocks, or contents of the wrapper.

17. The method of claim 15, wherein said trusted repository system encrypts said electronic original information object using an owner organization's storage key.

18. The method of claim 15, wherein said trusted repository system provides a separate partition within said database management system for each owner organization and wherein all electronic original information objects in each said partition are encrypted.

19. The method of claim 1, wherein said creating step further comprises the steps by said trusted repository system of
   flattening a multilayer information object into a single layer information object; and
   displaying within said flattened information object one or more previously applied electronic signatures.

20. The method of claim 19, wherein each said one or more previously applied electronic signatures are displayed by said trusted repository system in said single layer information object according to an authorization of an owner of said information object.

21. The method of claim 19, wherein said single layer information object displays a previously applied renderable electronic signature in rendered form within said information object and displays a name of a signer previously applying a multimedia signature in text form within said information object.

22. The method of claim 21, wherein said text is a link to said previously applied multimedia signature and wherein said previously applied multimedia signature is placed by said trusted repository system within a wrapper with said single layer information object for communication to said remote computer workstation.

23. The method of claim 22, wherein selection of said text by said authenticated user launches a software application to show said multimedia signature on a display of said remote computer workstations.

24. The method of claim 1, wherein upon receiving an authenticated instruction from said remote computer workstation to create a certified copy of an electronic original information object, said trusted repository system creates said certified copy by the steps of:
   creating a copy of said electronic original information object;
   retrieving said copy of said electronic original information object;
   verifying said copy of said electronic original information object against said second tamper seal;
   flattening said copy of said electronic original information object to show applied renderable electronic signatures in rendered form within said copy of said electronic original information object, and displaying a name of a signer previously applying a multimedia signature in text form within said copy of said electronic original along with the date said signatures were applied;
   adding to said flattened copy of said electronic original information object a forgery-resistant indicia that clearly identifies that said copy is a certified copy of an electronic original information object held and controlled by the trusted repository system; and
   communicating said flattened, marked copy of said electronic original information object to said remote computer workstation via said communications network; whereby said copy can be rendered for display by said remote computer workstation.

25. The method of claim 1, wherein upon receiving an authenticated instruction from said remote computer workstation to export to paper an electronic original information object, said trusted repository executes said instruction by the steps of:
   marking said electronic original information object and a related transaction as locked so to be inaccessible by any party;
   creating a copy of said electronic original information object;
   retrieving said copy of said electronic original information object;
   verifying said copy of said electronic original information object against said second tamper seal;
   flattening said copy of said electronic original information object to show applied renderable electronic signatures in rendered form within said flattened copy of said electronic original information object, and displaying a name of a signer previously applying a multimedia signature in text form within said flattened copy of said electronic original along with the date said signatures were applied;

adding to said flattened copy of said electronic original information object a forgery-resistant indicia that shows the name and location of the trusted repository system, the date the retrieving took place and further stating that the said flattened copy of said electronic original information object is certified to be an accurate rendition of the electronic original information object;

printing by said remote computer workstation the flattened, signed, dated, marked copy of said electronic original information object and an audit trail associated with said electronic original information object; and deleting by said trusted repository system the electronic original information object.

26. The method of claim 25, wherein multiple electronic original information objects related to said transaction can be exported to paper by said trusted repository system by iterative repetition of the method steps with the additional step of adding copies of each electronic original information object and audit trail to a data file archive before said step of printing.

27. The method of claim 1, wherein upon receiving an authenticated instruction from said remote computer workstation to transfer ownership of an electronic original information object that is a transferable record relating to a transaction, said trusted repository executes said instruction by the steps of:

querying a prospective buyer about their acceptance of the terms of said transfer;

on receipt of an affirmative acceptance of said terms, receiving or creating a notice of assignment of the transferable record that is the electronic original information object from the current owner to the designated new owner;

marking said electronic original information object and a related transaction as locked so to be inaccessible by any party validating said second tamper seal applied to the electronic original information object;

updating said trusted repository system database to give ownership and control of said electronic original information object to a new designated owner;

applying a set of organizational administrative controls of said new owner to said electronic original information object; and unlocking said electronic original information object and related transaction.

28. The method of claim 27, further comprising terminating by said trusted repository said transfer if an affirmative acceptance of said terms of said transfer is not received.

29. The method of claim 1, wherein upon receipt by said first trusted repository system of an authenticated instruction from an authenticated user via a remote computer workstation to transfer custody of one or more electronic information objects to a second party, said trusted repository system executes said instruction by the steps of:

locking said electronic original information object and related transaction so as to be inaccessible by any party;

creating a manifest identifying all electronic information objects to be transferred to said second party;

adding to a data compression and file archive, the electronic original information objects, related electronic information objects listed in said manifest and audit trails therefore;

transmitting said manifest and data compression and file archive from said first trusted repository system to said second party;

receiving, extracting, verifying, tamper sealing, and storing by said second party said information objects identified in said manifest;

notifying by said second party of said trusted repository system that said transfer of custody was completed successfully; and impairing or deleting all transferred electronic information objects that were listed in said manifest by said first trusted repository system upon receipt of said notice from said second party.

30. The method of claim 29 further comprising the steps of notifying by said second party of said trusted repository system if any information objects identified in said manifest are missing from said data compression and file archive; packaging and transmitting said identified missing information objects from said trusted repository system to said second party.

31. The method of claim 29, wherein said second party is said authenticated user.

32. The method of claim 29, wherein said second party is a second trusted repository system, and wherein said step of receiving, extracting, verifying, tamper sealing, and storing includes appropriately restoring by said second party said audit trail in said second trusted repository system.

33. The method of claim 25, wherein upon receiving an authenticated instruction from said remote computer workstation to retain a copy of said electronic original information object, said trusted repository system retains said flattened, signed, dated, marked copy of said electronic original information object.

34. The method of claim 25, wherein upon receiving no authenticated instruction from said remote computer workstation to retain a copy of said electronic original information object, said trusted repository system deletes said flattened, signed, dated, marked copy of said electronic original information object.

* * * * *